US011445252B1

United States Patent
Kim et al.

(10) Patent No.: US 11,445,252 B1
(45) Date of Patent: Sep. 13, 2022

(54) PRIORITIZING ENCODING OF VIDEO DATA RECEIVED BY AN ONLINE SYSTEM TO MAXIMIZE VISUAL QUALITY WHILE ACCOUNTING FOR FIXED COMPUTING CAPACITY

(71) Applicant: Meta Platforms, Inc., Menlo Park, CA (US)

(72) Inventors: Taein Kim, Kirkland, WA (US); Nutcha Temiyasathit, Sunnyvale, CA (US); Haixiong Wang, Sunnyvale, CA (US)

(73) Assignee: Meta Platforms, Inc., Menlo Park, CA (US)

( * ) Notice: Subject to any disclaimer, the term of this patent is extended or adjusted under 35 U.S.C. 154(b) by 0 days.

(21) Appl. No.: 17/371,041

(22) Filed: Jul. 8, 2021

(51) Int. Cl.
  *H04N 21/2343* (2011.01)
  *H04N 21/2662* (2011.01)
  *H04N 21/462* (2011.01)
  *H04N 19/103* (2014.01)

(52) U.S. Cl.
  CPC ....... *H04N 21/4621* (2013.01); *H04N 19/103* (2014.11); *H04N 21/2343* (2013.01); *H04N 21/23439* (2013.01); *H04N 21/234309* (2013.01); *H04N 21/2662* (2013.01)

(58) Field of Classification Search
  CPC ......... H04N 21/23439; H04N 21/2343; H04N 21/2662; H04N 21/4621
  See application file for complete search history.

(56) References Cited

U.S. PATENT DOCUMENTS

| | | | | |
|---|---|---|---|---|
| 9,648,395 | B1 * | 5/2017 | Henry | H04L 65/80 |
| 10,893,310 | B1 * | 1/2021 | Wu | H04N 21/2387 |
| 11,178,413 | B1 * | 11/2021 | Li | H04N 21/44204 |
| 2010/0023579 | A1 * | 1/2010 | Chapweske | H04L 29/06 709/203 |
| 2011/0307929 | A1 * | 12/2011 | Youssefmir | H04N 21/262 725/89 |
| 2015/0024839 | A1 * | 1/2015 | Zahn | A63F 13/00 463/31 |
| 2015/0127845 | A1 * | 5/2015 | Phillips | H04N 21/26258 709/231 |
| 2016/0059137 | A1 * | 3/2016 | Zahn | H04N 21/8173 463/31 |

(Continued)

FOREIGN PATENT DOCUMENTS

| | | | | |
|---|---|---|---|---|
| EP | 2466870 B1 * | 7/2015 | | H04L 65/4084 |
| WO | WO-2016202890 A1 * | 12/2016 | | H04H 60/46 |

*Primary Examiner* — Robert J Hance
(74) *Attorney, Agent, or Firm* — Fenwick & West LLP

(57) ABSTRACT

An online system receives video data items from users and encodes the video data items using various codecs. To account for different computational resources used for encoding using different codecs, the online system ranks combinations of video data items by ratios of encoding video data items with different codecs to computational costs of encoding different video data items with different codecs. The benefit of encoding a video data item with a codec is based on a compression efficiency of the codec and a predicted aggregate amount of the video data item displayed to various users of the online system. Encoding video data items with codecs based on the determined ratios allows the online system to optimize a duration of video data having at least a threshold video quality to users.

22 Claims, 3 Drawing Sheets

(56) References Cited

U.S. PATENT DOCUMENTS

| | | | |
|---|---|---|---|
| 2019/0110096 A1* | 4/2019 | Shaw | H04N 21/23106 |
| 2019/0200079 A1* | 6/2019 | Mathur | H04N 21/4402 |
| 2020/0204804 A1* | 6/2020 | Chen | H04N 19/124 |
| 2021/0185368 A1* | 6/2021 | Hao | H04N 21/23106 |

* cited by examiner

PRIORITIZING ENCODING OF VIDEO DATA RECEIVED BY AN ONLINE SYSTEM TO MAXIMIZE VISUAL QUALITY WHILE ACCOUNTING FOR FIXED COMPUTING CAPACITY

BACKGROUND

This disclosure relates generally to encoding video data, and more specifically to encoding video data by an online system that accounts for varying computing resources used by different encoding standards.

Users of online systems increasingly communicate by exchanging video data captured by their respective client devices. For example, a user captures video data and provides the captured video content to an online system for distribution to and presentation to other users of the online system. This exchange of video content allows users of an online system to easily obtain video data about a range of topics or subjects.

An online system receives video data from a user and encodes the video data into various compressed versions. The encoded versions of the video data are subsequently distributed by the online system to other users for display. In various embodiments, the online system encodes video data using different encoding standards, creating multiple versions of the video data with each encoding standard. For example, the online system encodes the video data using a basic encoding standard to create four encoded versions of the video data that each have a different resolution, while encoding the video data with a more advanced encoding standard to create an additional four encoded versions of the video data each having different resolutions. Maintaining multiple versions of the video data allows the online system to select a version of the video data for transmitting to a user accounting for the bandwidth available for transmitting the video data to the user, as well as a codec used by a client device of the user to display the video data to the user.

Using advanced encoding standards to encode versions of the video data allows an online system to provide improved compression of the video data relative to more basic, or older, encoding standards. However, application of the advanced encoding standards to the video data requires increased computing resources for the online system. As the online system receives an increasing amount of video data from users, applying advanced encoding standards to all video data received by the online system to generate the compressed versions of the video data would consume be a prohibitive use of the computing resources available to the online system. Such an inefficient allocation of the online system's computing resources would delay generation of compressed versions of an amount of video data, delaying transmission of a compressed version of the video data to users.

While conventional online systems may maintain rules for prioritizing encoding of different video data, with the rules determining an order in which different video data is encoded, as a number of codecs available for encoding video data increases, the number of rules to be maintained and applied is correspondingly increased. Further, such a system of rules does not accurately account for trade-offs between video quality from encoding, computing requirements, and compression of versions of the video data. Additionally, different video data often has differing rates of being watched by different users of the online system, regardless of characteristics of a user from whom the online system received the video data, with video data obtained from online system users connected to a relatively small number of other users capable of being requested for display by a large number of online system users. This unpredictability in potential display of different video data to different users increases unpredictability in how differently encoding different video data affects subsequent transmission and display of video data to users.

SUMMARY

An online system obtains video data from one or more users of the online system for exchange with one or more other users of the online system. For example, the online system receives video data captured by an image capture device of a client device of a user. In other embodiments, the video data obtained by the online system is generated by a client device and transmitted from the client device to the online system. For purposes of illustration, different video data is referred to herein as a "video data item."

The online system allows other users to access a video data item the online system obtained from a user. For example, the online system receives a selection of a video data item from a viewing user that identifies a video data item the online system obtained from a user. The online system retrieves the video data item identified by the viewing user and transmits the identified video data item to a client device of the viewing user for display. To facilitate storage of video data items and subsequent transmission of video data items to users of the online system, the online system generates compressed versions of a video data item obtained from a user by applying one or more codecs to the video data item and storing the compressed versions of the video data item. In various embodiments, the online system encodes the video data item into a plurality of compressed versions, with each compressed version having a different resolution. For example, the online system applies a codec to a video data item and generates different compressed versions of the video data item corresponding to resolutions of 380p, 480p, 720p, and 1080p. To improve video data storage and transmission to other users, the online system applies various codecs that provide varying levels of compression to the video data item, allowing the online system to maintain different versions of the video data item for transmission to users. Maintaining various versions of the video data with different levels of compression allows the online system to account for varying levels of bandwidth coupling client devices to the online system.

However, different codecs applied to a video data item consume different amounts of computing resources of the online system. For example, application of a VP9 codec allows the online system to produce versions of a video data item with increased compression relative to application of a H264 codec, while consuming greater computing resources than application of the H264 codec. As the online system has limited computing resources to allocate for application of different codecs to video data items, the online system accounts for predicted watching of video data items by users to determine an order in which different codecs are applied to video data items. This allows the online system to more efficiently apply codecs to video data items likely to be watched by users, reducing buffering when providing different video data items to client devices of users.

In various embodiments, the online system initially encodes an obtained video data item with a baseline codec, such as an H264 codec. The initial encoding results in a set of baseline versions of the video data item, with different baseline versions corresponding to different resolutions. For example, application of the baseline codec results in a baseline version of the video data item at a 360p resolution, a baseline version of the video data item at a 480p resolution, a baseline version of the video data item at a 720p resolution, and a baseline version of the video data item at a 1080p resolution. However, in various embodiments, application of the baseline codec generates any number of versions of the video data item or versions of the video data item with any suitable resolutions.

To determine an order in which video data items are encoded by the online system, the online system determines a benefit to the online system for encoding different video data items with each of a set of codecs. In various embodiments, the online system determines a benefit to the online system for encoding each of at least a set of video data items with each codec of the set of codecs. The online system determines a benefit to the online system for encoding a video data item with a codec based on a compression efficiency of the codec and a predicted watch time of the video data item by users of the online system.

In various embodiments, the online system determines the compression efficiency of a codec based on historical compression efficiency of video data items previously encoded using the codec. The compression efficiency of a codec is specified relative to a baseline codec, such as the baseline codec used to initially encode the video data item. In various embodiments, the online system 140 determines the compression efficiency of a codec based on a time of the video data item available for display with a threshold video quality per specific amount of data when encoded with the codec. For example, the online system 140 determines a number of minutes of the video data item available for display at a threshold video quality per one gigabyte of data when the video data item is encoded with the codec. However, in other embodiments, the online system determines any suitable temporal quantity of a video data item available for display at the threshold video quality per specific amount of data when encoded by the codec. The threshold video quality may be a specific resolution specified by the online system or any other suitable characteristic describing display of video data to a user. For application of a codec to a video data item, the online system determines an amount of time of the video data item available for display with a threshold video quality per specific amount of data for each of a set of versions of the video data encoded at different bitrates by the codec then determines a ratio of the specific amount of data to the average amount of time of the video data item available for display with the threshold video quality per specific amount of data for each of the set of versions of the video data encoded at different bitrates by the codec. In various embodiments, the online system maintains a table of relative compression efficiencies for different codecs based on historical encoding of video data items with different codecs (e.g., specific ratios of an amount of time that a user is capable of watching a video data item encoded with the codec with at least the threshold video quality per specific amount of data to an amount of time that a user is capable of watching a video data item encoded with a baseline codec with at least the threshold video quality per specific amount of data), allowing the online system to retrieve a compression efficiency for a codec from the table.

Additionally, to determine the benefit to the online system for encoding a video data item with a codec, the online system determines a predicted watch time of the video data item by users of the online system. To determine the predicted watch time of the video data item, the online system applies a trained watch prediction model to characteristics of the video data item and to characteristics of a user from whom the video data item was obtained. Example characteristics of the video data item to which the trained watched prediction model is applied include: a duration of the video data item, dimensions of the video data item (e.g., a height and a width of the video data item, which may be specified as numbers of pixels), a type of the video data item, one or more privacy settings of the video data item, a length of time the video data item has been accessible to users via the online system, and any other suitable information describing the video data item. Example characteristics of a user from whom the video data item was obtained include a geographic location of the user (e.g., a country associated with the user), a number of users of the online system 140 connected to the user, as well as any other suitable information.

In some embodiments, the watch prediction model also receives prior interaction with the video data item by users as an input. Example prior interactions with the video data item include interactions with the video data item occurring during different time intervals (e.g., within an hour before the watch prediction model is applied, within 30 minutes before the watch prediction model is applied, within one minute before the watch prediction model is applied). Prior interactions with the video data item include an aggregate amount of time the video data item was displayed to users of the online system, so the watch prediction model may receive as input different aggregated amounts of time the video data item was displayed to users of the online system during different time intervals.

To account for video data items having less than a threshold amount of prior interactions by users of the online system when determining predicted watch time, the online system trains and maintains an initial watch prediction model that accounts for limited amount of interaction by users with video data items. In various embodiments, when the amount of interaction with a video data item is less than a threshold amount, the online system uses the initial watch prediction model to characteristics of the video data and to characteristics of the user from whom the video data item was obtained. For example, the online system determines that an aggregate amount of time users of the online system have watched a video data item during a specific time interval is less than a threshold duration and applies the initial watch prediction model to the video data item to determine the watch prediction of the video data item. The initial watch prediction model retrieves other video data items the online system obtained from the user from whom the video data item was obtained and determines prior interaction with the other video data items obtained from the users. For example, the online system determines an aggregate amount of time different video data items obtained from the user were displayed to online system users during different time intervals and generates an estimated aggregate amount of time video data items were displayed to online system users from the aggregate amount of time other video data items obtained from the user were displayed to online system users (e.g., a mean, median, or mode aggregate amount of time different video data items obtained from the user were displayed to online system users during a time interval). However, the online system may determine any suitable estimated amount of user interaction with the video data item from user interactions with other video data items obtained from the user. The online system trains the initial predicted watch model similar to the predicted watch model further described above, using the estimated amount of interaction with the video data item in the initial predicted watch model rather than prior interactions with the video data item in the predicted watch model. The online system applies the initial predicted watch model to characteristics of the video data item and characteristics of the user from whom the video content item was obtained as well as to the estimated amount of interaction with the video data item determined from prior interactions by users with other video data items the online system obtained from the user. In various embodiments, when the amount of interaction (e.g., aggregate amount of time online system users watched the video data item) equals or exceeds the threshold amount, the online system applies the watch prediction model to characteristics of the video data item, characteristics of the user, and prior interactions by online system users with the video data item.

Additionally, the online system accounts for characteristics of client devices of users accessing the online system when determining a predicted watch time of a video data item. Based on characteristics of client devices the online system obtains from the client devices or from the users associated with the client devices, the online system determines a percentage of client devices capable of displaying video data items encoded with different codecs. The online system determines an effective predicted watch time of a video data item when encoded with a codec by applying the predicted watch model to the video data item, generating a predicted watch time of the video data item, and scaling the predicted watch time of the video data item by a percentage of client devices capable of displaying video data items encoded with the codec. For example, the online system determines from data describing client devices configured to communicate with the online system that 80% of client devices are capable of displaying video data encoded with a particular codec, so when determining the predicted watch time of a video data item encoded with the particular codec, the online system multiplies a predicted watch time of the video data item from the precited watch model by 80%. This determines an effective predicted watch time that accounts for a number of client devices that are unable to display video data items encoded with certain codecs.

The online system also determines a computational cost for encoding a video data item with a codec. The online system is unable to distribute a video data item encoded with a particular codec to users until the online system stores a minimum set of versions of the video data item encoded with the particular codec, with the minimum set of versions including at least a specified group of different resolutions. For example, the minimum set of versions of the video data item includes versions of the video data item corresponding to resolutions of 360p, 480p, 760p, and 1080p. Different codecs may have different resolutions or numbers of versions of the video data item included in the minimum set of versions. From historical encoding of prior video data items with a codec, the online system determines an amount of computing resources needed to generate different versions of the video data item in the minimum set of versions for the codec. The amount of computing resources may specify an amount of processor time to generate a version of the video data encoded with the codec, a number of processor cycles to generate the version of the video data encoded with the codec, or any other suitable value describing computing resources of the online system used to generate a version of the video data encoded with the codec.

In various embodiments, the online system determines the computational cost of encoding a video data item with a codec by identifying versions of the video data item of the minimum set of versions for the codec that have not been generated by the online system. The online system 140 determines an amount of computing resources to generate each version of the video data item of the minimum set of versions of the codec that have not been generated and generates a value by combining each of the determined amount of computing resources. For example, the online system generates the value as a sum of the amount of computing resources determined for each version of the minimum set of versions of the codec that has not been generated. The online system assigns the generated value to each version of the minimum set of versions of the codec that has not been generated and combines the values assigned to each version of the minimum set of versions that has not been generated to determine the computational cost of encoding the video data item with the codec. This allows the online system to increase a priority of a particular codec as a number of versions of the video data item in the minimum set of versions of the codec increases, so the online system prioritizes completion of generation of the number of versions of the video data item in the minimum set of versions, which allows the online system 140 to distribute the video data item encoded with the particular codec.

To order video content items for encoding, for each combination of video content and codec, the online system determines a ratio of the benefit to the online system for encoding the video data item with a codec to the computational cost for encoding a video data item with a codec. Based on the ratios determined for combinations of video data items and codecs, the online system generates a ranking of combinations of video data items and codecs. In various embodiments, the ranking includes combinations of video data items and codecs with higher ratios in higher positions of the ranking to prioritized encoding of video data items with codecs having higher ratios of benefit to cost. However, in various embodiments, the online system generates the ranking using any suitable criteria to optimize an order in which the online system allocates computing resources to different combinations of video data items and codecs.

The figures depict various embodiments for purposes of illustration only. One skilled in the art will readily recognize from the following discussion that alternative embodiments of the structures and methods illustrated herein may be employed without departing from the principles described herein.

DETAILED DESCRIPTION

System Architecture

Figure 1:
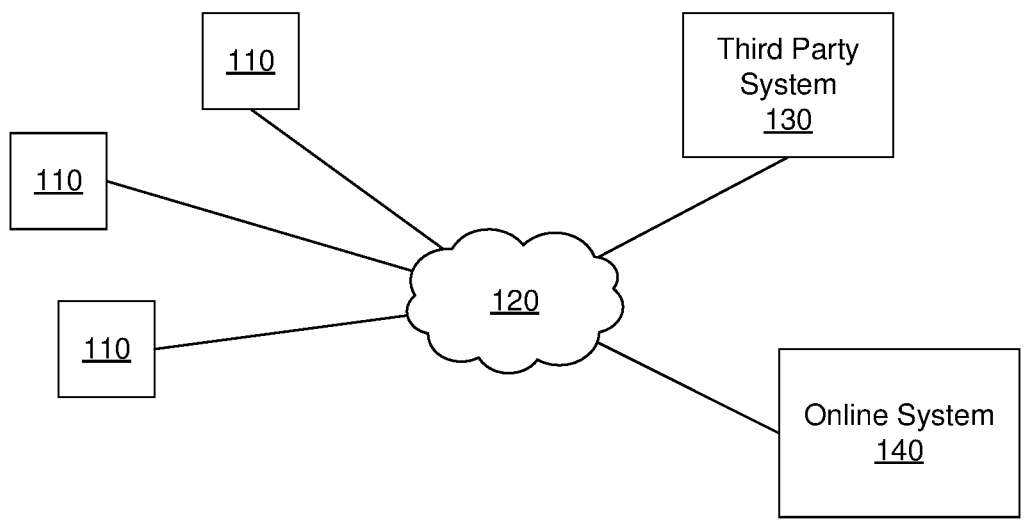
FIG. 1 is a block diagram of a system environment in which an online system operates, in accordance with an embodiment.

FIG. 1 is a block diagram of a system environment 100 for an online system 140. The system environment 100 shown by FIG. 1 comprises one or more client devices 110, a network 120, one or more third-party systems 130, and the online system 140. In alternative configurations, different and/or additional components may be included in the system environment 100. For example, the online system 140 is a social networking system, a content sharing network, or another system providing content to users.

The client devices 110 are one or more computing devices capable of receiving user input as well as transmitting and/or receiving data via the network 120. In one embodiment, a client device 110 is a conventional computer system, such as a desktop or a laptop computer. Alternatively, a client device 110 may be a device having computer functionality, such as a personal digital assistant (PDA), a mobile telephone, a smartphone, or another suitable device. A client device 110 is configured to communicate via the network 120. In one embodiment, a client device 110 executes an application allowing a user of the client device 110 to interact with the online system 140. For example, a client device 110 executes a browser application to enable interaction between the client device 110 and the online system 140 via the network 120. In another embodiment, a client device 110 interacts with the online system 140 through an application programming interface (API) running on a native operating system of the client device 110, such as IOS® or ANDROID™.

The client devices 110 are configured to communicate via the network 120, which may comprise any combination of local area and/or wide area networks, using both wired and/or wireless communication systems. In one embodiment, the network 120 uses standard communications technologies and/or protocols. For example, the network 120 includes communication links using technologies such as Ethernet, 802.11, worldwide interoperability for microwave access (WiMAX), 3G, 4G, code division multiple access (CDMA), digital subscriber line (DSL), etc. Examples of networking protocols used for communicating via the network 120 include multiprotocol label switching (MPLS), transmission control protocol/Internet protocol (TCP/IP), hypertext transport protocol (HTTP), simple mail transfer protocol (SMTP), and file transfer protocol (FTP). Data exchanged over the network 120 may be represented using any suitable format, such as hypertext markup language (HTML) or extensible markup language (XML). In some embodiments, all or some of the communication links of the network 120 may be encrypted using any suitable technique or techniques.

One or more third party systems 130 may be coupled to the network 120 for communicating with the online system 140, which is further described below in conjunction with FIG. 2. In one embodiment, a third party system 130 is an application provider communicating information describing applications for execution by a client device 110 or communicating data to client devices 110 for use by an application executing on the client device. In other embodiments, a third party system 130 provides content or other information for presentation via a client device 110. A third party system 130 may also communicate information to the online system 140, such as advertisements, content, or information about an application provided by the third party system 130.

Figure 2:
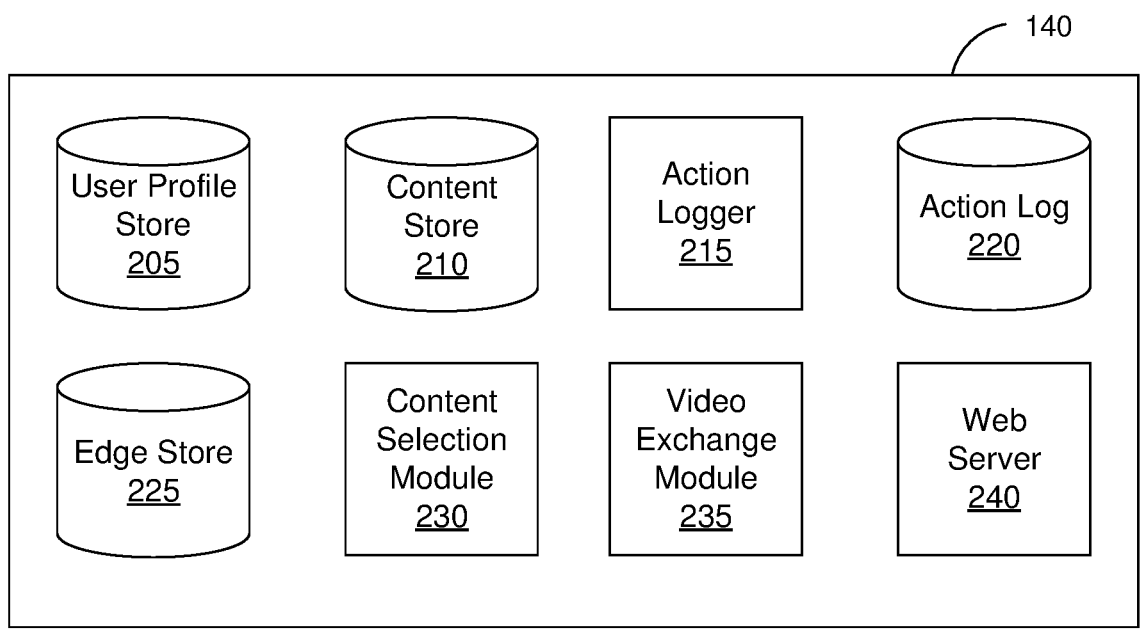
FIG. 2 is a block diagram of an online system, in accordance with an embodiment.

FIG. 2 is a block diagram of an architecture of the online system 140. The online system 140 shown in FIG. 2 includes a user profile store 205, a content store 210, an action logger 215, an action log 220, an edge store 225, a content selection module 230, a video exchange module 235, and a web server 240. In other embodiments, the online system 140 may include additional, fewer, or different components for various applications. Conventional components such as network interfaces, security functions, load balancers, failover servers, management and network operations consoles, and the like are not shown so as to not obscure the details of the system architecture.

Each user of the online system 140 is associated with a user profile, which is stored in the user profile store 205. A user profile includes declarative information about the user that was explicitly shared by the user and may also include profile information inferred by the online system 140. In one embodiment, a user profile includes multiple data fields, each describing one or more attributes of the corresponding online system user. Examples of information stored in a user profile include biographic, demographic, and other types of descriptive information, such as work experience, educational history, gender, hobbies or preferences, location and the like. A user profile may also store other information provided by the user, for example, images or videos. In certain embodiments, images of users may be tagged with information identifying the online system users displayed in an image, with information identifying the images in which a user is tagged stored in the user profile of the user. A user profile in the user profile store 205 may also maintain references to actions by the corresponding user performed on content items in the content store 210 and stored in the action log 220.

While user profiles in the user profile store 205 are frequently associated with individuals, allowing individuals to interact with each other via the online system 140, user profiles may also be stored for entities such as businesses or organizations. This allows an entity to establish a presence on the online system 140 for connecting and exchanging content with other online system users. The entity may post information about itself, about its products or provide other information to users of the online system 140 using a brand page associated with the entity's user profile. Other users of the online system 140 may connect to the brand page to receive information posted to the brand page or to receive information from the brand page. A user profile associated with the brand page may include information about the entity itself, providing users with background or informational data about the entity.

The content store 210 stores objects that each represent various types of content. Examples of content represented by an object include a page post, a status update, a photograph, a video, a link, a shared content item, a gaming application achievement, a check-in event at a local business, a brand page, or any other type of content. Online system users may create objects stored by the content store 210, such as status updates, photos tagged by users to be associated with other objects in the online system 140, events, groups or applications. In some embodiments, objects are received from third-party applications or third-party applications separate from the online system 140. In one embodiment, objects in the content store 210 represent single pieces of content, or content "items." Hence, online system users are encouraged to communicate with each other by posting text and content items of various types of media to the online system 140 through various communication channels. This increases the amount of interaction of users with each other and increases the frequency with which users interact within the online system 140.

The action logger 215 receives communications about user actions internal to and/or external to the online system 140, populating the action log 220 with information about user actions. Examples of actions include adding a connection to another user, sending a message to another user, uploading an image, reading a message from another user, viewing content associated with another user, and attending an event posted by another user. In addition, a number of actions may involve an object and one or more particular users, so these actions are associated with the particular users as well and stored in the action log 220.

The action log 220 may be used by the online system 140 to track user actions on the online system 140, as well as actions on third party systems 130 that communicate information to the online system 140. Users may interact with various objects on the online system 140, and information describing these interactions is stored in the action log 220. Examples of interactions with objects include: commenting on posts, sharing links, checking-in to physical locations via a client device 110, accessing content items, and any other suitable interactions. Additional examples of interactions with objects on the online system 140 that are included in the action log 220 include: commenting on a photo album, communicating with a user, establishing a connection with an object, joining an event, joining a group, creating an event, authorizing an application, using an application, expressing a preference for an object ("liking" the object), and engaging in a transaction. Additionally, the action log 220 may record a user's interactions with advertisements on the online system 140 as well as with other applications operating on the online system 140. In some embodiments, data from the action log 220 is used to infer interests or preferences of a user, augmenting the interests included in the user's user profile and allowing a more complete understanding of user preferences.

The action log 220 may also store user actions taken on a third party system 130, such as an external website, and communicated to the online system 140. For example, an e-commerce website may recognize a user of an online system 140 through a social plug-in enabling the e-commerce website to identify the user of the online system 140. Because users of the online system 140 are uniquely identifiable, e-commerce websites, such as in the preceding example, may communicate information about a user's actions outside of the online system 140 to the online system 140 for association with the user. Hence, the action log 220 may record information about actions users perform on a third party system 130, including webpage viewing histories, advertisements that were engaged, purchases made, and other patterns from shopping and buying. Additionally, actions a user performs via an application associated with a third party system 130 and executing on a client device 110 may be communicated to the action logger 215 by the application for recordation and association with the user in the action log 220.

In one embodiment, the edge store 225 stores information describing connections between users and other objects on the online system 140 as edges. Some edges may be defined by users, allowing users to specify their relationships with other users. For example, users may generate edges with other users that parallel the users' real-life relationships, such as friends, co-workers, partners, and so forth. Other edges are generated when users interact with objects in the online system 140, such as expressing interest in a page on the online system 140, sharing a link with other users of the online system 140, and commenting on posts made by other users of the online system 140.

An edge may include various features each representing characteristics of interactions between users, interactions between users and objects, or interactions between objects. For example, features included in an edge describe a rate of interaction between two users, how recently two users have interacted with each other, a rate or an amount of information retrieved by one user about an object, or numbers and types of comments posted by a user about an object. The features may also represent information describing a particular object or user. For example, a feature may represent the level of interest that a user has in a particular topic, the rate at which the user logs into the online system 140, or information describing demographic information about the user. Each feature may be associated with a source object or user, a target object or user, and a feature value. A feature may be specified as an expression based on values describing the source object or user, the target object or user, or interactions between the source object or user and target object or user; hence, an edge may be represented as one or more feature expressions.

The edge store 225 also stores information about edges, such as affinity scores for objects, interests, and other users. Affinity scores, or "affinities," may be computed by the online system 140 over time to approximate a user's interest in an object or in another user in the online system 140 based on the actions performed by the user. A user's affinity may be computed by the online system 140 over time to approximate the user's interest in an object, in a topic, or in another user in the online system 140 based on actions performed by the user. Computation of affinity is further described in U.S. patent application Ser. No. 12/978,265, filed on Dec. 23, 2010, U.S. patent application Ser. No. 13/690,254, filed on Nov. 30, 2012, U.S. patent application Ser. No. 13/689,969, filed on Nov. 30, 2012, and U.S. patent application Ser. No. 13/690,088, filed on Nov. 30, 2012, each of which is hereby incorporated by reference in its entirety. Multiple interactions between a user and a specific object may be stored as a single edge in the edge store 225, in one embodiment. Alternatively, each interaction between a user and a specific object is stored as a separate edge. In some embodiments, connections between users may be stored in the user profile store 205, or the user profile store 205 may access the edge store 225 to determine connections between users.

The content selection module 230 selects one or more content items for communication to a client device 110 to be presented to a user. Content items eligible for presentation to the user are retrieved from the content store 210 or from another source by the content selection module 230, which selects one or more of the content items for presentation to the viewing user. A content item eligible for presentation to the user is a content item associated with at least a threshold number of targeting criteria satisfied by characteristics of the user or is a content item that is not associated with targeting criteria. In various embodiments, the content selection module 230 includes content items eligible for presentation to the user in one or more selection processes, which identify a set of content items for presentation to the user. For example, the content selection module 230 determines measures of relevance of various content items to the user based on characteristics associated with the user by the online system 140 and based on the user's affinity for different content items. Based on the measures of relevance, the content selection module 230 selects content items for presentation to the user. As an additional example, the content selection module 230 selects content items having the highest measures of relevance or having at least a threshold measure of relevance for presentation to the user.

Alternatively, the content selection module 230 ranks content items based on their associated measures of relevance and selects content items having the highest positions in the ranking or having at least a threshold position in the ranking for presentation to the user.

Content items eligible for presentation to the user may include content items associated with bid amounts. The content selection module 230 uses the bid amounts associated with content items when selecting content for presentation to the user. In various embodiments, the content selection module 230 determines an expected value associated with various content items based on their bid amounts and selects content items associated with a maximum expected value or associated with at least a threshold expected value for presentation. An expected value associated with a content item represents an expected amount of compensation to the online system 140 for presenting the content item. For example, the expected value associated with a content item is a product of the content item's bid amount and a likelihood of the user interacting with the content item. The content selection module 230 may rank content items based on their associated bid amounts and select content items having at least a threshold position in the ranking for presentation to the user. In some embodiments, the content selection module 230 ranks both content items not associated with bid amounts and content items associated with bid amounts in a unified ranking based on bid amounts and measures of relevance associated with content items. Based on the unified ranking, the content selection module 230 selects content for presentation to the user. Selecting content items associated with bid amounts and content items not associated with bid amounts through a unified ranking is further described in U.S. patent application Ser. No. 13/545,266, filed on Jul. 10, 2012, which is hereby incorporated by reference in its entirety.

For example, the content selection module 230 receives a request to present a feed of content to a user of the online system 140. The feed may include one or more content items associated with bid amounts and other content items, such as stories describing actions associated with other online system users connected to the user, which are not associated with bid amounts. The content selection module 230 accesses one or more of the user profile store 205, the content store 210, the action log 220, and the edge store 225 to retrieve information about the user. For example, information describing actions associated with other users connected to the user or other data associated with users connected to the user are retrieved. Content items from the content store 210 are retrieved and analyzed by the content selection module 230 to identify candidate content items eligible for presentation to the user. For example, content items associated with users who not connected to the user or stories associated with users for whom the user has less than a threshold affinity are discarded as candidate content items. Based on various criteria, the content selection module 230 selects one or more of the content items identified as candidate content items for presentation to the identified user. The selected content items are included in a feed of content that is presented to the user. For example, the feed of content includes at least a threshold number of content items describing actions associated with users connected to the user via the online system 140.

In various embodiments, the content selection module 230 presents content to a user through a newsfeed including a plurality of content items selected for presentation to the user. One or more content items may also be included in the feed. The content selection module 230 may also determine the order in which selected content items are presented via the feed. For example, the content selection module 230 orders content items in the feed based on likelihoods of the user interacting with various content items.

The video exchange module 235 receives video data, such as different video data items, from client devices 110 of users or from third party systems 130. Video data items received by the video exchange module 235 are stored in the content store 210. The video exchange module 235 also maintains various codecs and applies the codecs to video data items. Application of a codec to a video data item generates one or more compressed versions of the video data item, which are stored in the content store 120. In various embodiments, a codec generates a set of different versions of the video data item, with each version corresponding to a different resolution of the video data item. Application of codecs to video data items allows the video exchange module 235 to generate compressed versions of the video data item to facilitate distribution of the video data item to client devices 110 through a network 120.

The video exchange module 235 applies various codecs that provide varying levels of compression to the video data item, allowing the online system 140 to maintain different versions of the video data item for transmission to users. Maintaining various versions of the video data with different levels of compression allows the video exchange module 235 to account for varying levels of bandwidth coupling client devices 110 to the online system 140. However, different codecs applied to a video data item consume different amounts of computing resources of the online system 140. For example, application of a VP9 codec allows the online system 140 to produce versions of a video data item with increased compression relative to application of a H264 codec, while consuming greater computing resources than application of the H264 codec.

To account for limited computing resources to allocate for application of different codecs to video data items, the video exchange module 235 accounts for predicted watching of video data items by users to determine an order in which different codecs are applied to video data items. This allows the video exchange module 235 to more efficiently allocate computing resources to encoded video data items with codecs to video data items likely to be watched by users, reducing buffering when providing different video data items to client devices 110 of users. As further described below in conjunction with FIGS. 3 and 4, the video exchange module 235 determines a benefit to the online system 140 for encoding different video data items with each of a set of codecs and determines a computational cost for encoding a video data item with a codec. As further described below in conjunction with FIG. 3, when determining the benefit for encoding a video data item with a codec, the video exchange module 235 determines a predicted watch time of the video data item. To determine the predicted watch time of a video data item, the online system 140 applies a trained watch prediction model to characteristics of the video data item and to characteristics of a user from whom the video data item was obtained. Example characteristics of the video data item to which the trained watched prediction model is applied include: a duration of the video data item, dimensions of the video data item (e.g., a height and a width of the video data item, which may be specified as numbers of pixels), a type of the video data item, one or more privacy settings of the video data item, a length of time the video data item has been accessible to users via the online system 140, and any other suitable information describing the video data item. In some embodiments, the watch prediction model also receives prior interaction with the video data item by users as an input. Example prior interactions with the video data item include interactions with the video data item occurring during different time intervals (e.g., within an hour before the watch prediction model is applied, within 30 minutes before the watch prediction model is applied, within one minute before the watch prediction model is applied). Prior interactions with the video data item include an aggregate amount of time the video data item was displayed to users of the online system. Training of the watch prediction model is further described below in conjunction with FIG. 3. The watch prediction model outputs a predicted aggregate watch time of the video data item across multiple users of the online system 140. That is, the watch prediction model accounts for durations of the video data item watched by various users of the online system 140.

Additionally, the benefit of encoding a video data item with a codec accounts for a compression efficiency of the codec, which the video exchange module 235 determines from prior encoding of video data items with the codec, as further described below in conjunction with FIG. 3. Hence, the benefit of encoding a video data item with a codec is based on a compression efficiency of the codec and a predicted watch From prior encoding of video data items with the codec, the video exchange module 230 also determines a computational cost of encoding video data items with the codec, as further described below in conjunction with FIG. 3. For various combinations of codecs and video content items, the video exchange module 235 determines a ratio of the benefit of encoding the video data item with a codec and the computational cost of encoding the video data item with the codec. Based on the ratios, the video exchange module 235 ranks combinations of video data items and codecs. Based on the ranking, the video exchange module 235 encodes a video data item in a combination of video data item and codec with the corresponding codec included in the combination. Hence, the ratios of benefit of encoding video data items with codecs and the computational cost of encoding the video data items with the codecs determine an order in which the video exchange module 235 encode different video data items with different codecs, as further described below in conjunction with FIG. 3.

The web server 240 links the online system 140 via the network 120 to the one or more client devices 110, as well as to the one or more third party systems 130. The web server 240 serves web pages, as well as other content, such as JAVA®, FLASH®, XML and so forth. The web server 240 may receive and route messages between the online system 140 and the client device 110, for example, instant messages, queued messages (e.g., email), text messages, short message service (SMS) messages, or messages sent using any other suitable messaging technique. A user may send a request to the web server 240 to upload information (e.g., images or videos) that are stored in the content store 210. Additionally, the web server 240 may provide application programming interface (API) functionality to send data directly to native client device operating systems, such as IOS®, ANDROID™, or BlackberryOS.

Figure 3:
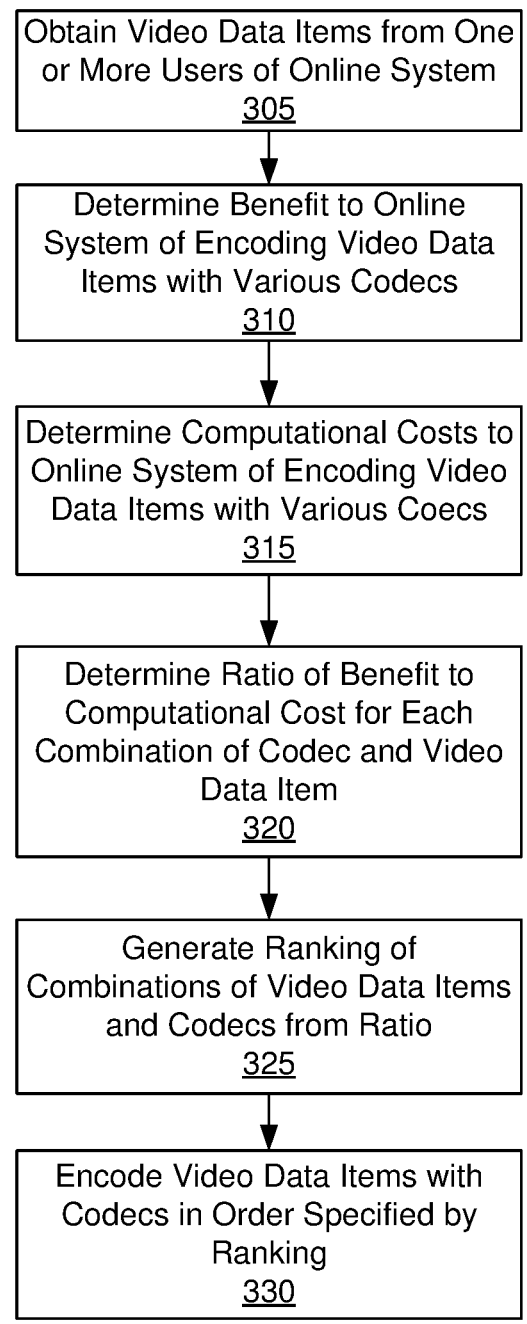
FIG. 3 is a flowchart of a method for an online system ordering video data items for encoding with codecs based on a predicted aggregate time video data items are displayed to users of the online system, in accordance with an embodiment.

Ordering Video Data Received by an Online System for Encoding Accounting for Predicted Total Watch Time of the Video Data by Users FIG. 3 is a flowchart of one embodiment of a method for an online system 140 ordering video data items for encoding with codecs based on a predicted aggregate time video data items are displayed to users of the online system 140. In various embodiments, the method includes different or additional steps than those described in conjunction with FIG. 3. Further, in some embodiments, the steps of the method are performed in different orders than the order described in conjunction with FIG. 3.

An online system 140 obtains 305 video data from one or more users of the online system 140 for exchange with one or more other users of the online system 140. For example, the online system 140 receives video data captured by an image capture device of a client device 110 of a user. In other embodiments, the video data obtained 305 by the online system 140 is generated by a client device 110 and transmitted from the client device 110 to the online system 140. For purposes of illustration, different video data is referred to herein as a "video data item," so the online system 140 may obtain different video data items from a user, as well as obtain 305 video data items from various users.

The online system 140 allows other users to access a video data item the online system 140 obtained from a user. For example, the online system 140 receives a selection of a video data item from a viewing user that identifies a video data item the online system 140 obtained 405 from a user. The online system 140 retrieves the video data item identified by the viewing user and transmits 140 the identified video data item to a client device 110 of the viewing user for display. To facilitate storage of video data items and subsequent transmission of video data items to users of the online system 140, the online system 140 generates compressed versions of a video data item obtained 405 from a user by applying one or more codecs to the video data item and storing the compressed versions of the video data item. In various embodiments, the online system 140 encodes the video data item into a plurality of compressed versions, with each compressed version having a different resolution. For example, the online system 140 applies a codec to a video data item and generates different compressed versions of the video data item corresponding to resolutions of 380p, 480p, 720p, and 1080p. To improve video data storage and transmission to other users, the online system 140 applies various codecs that provide varying levels of compression to the video data item, allowing the online system 140 to maintain different versions of the video data item for transmission to users. Maintaining various versions of the video data with different levels of compression allows the online system 140 to account for varying levels of bandwidth coupling client devices 110 to the online system 140.

However, different codecs applied to a video data item consume different amounts of computing resources of the online system 140. For example, application of a VP9 codec allows the online system 140 to produce versions of a video data item with increased compression relative to application of a H264 codec, while consuming greater computing resources than application of the H264 codec. As the online system 140 has limited computing resources to allocate for application of different codecs to video data items, the online system 140 accounts for predicted watching of video data items by users to determine an order in which different codecs are applied to video data items. This allows the online system 140 to more quickly apply more efficient codecs to video data items likely to be watched by users, reducing buffering when providing different video data items to client devices 110 of users.

In various embodiments, the online system 140 initially encodes an obtained video data item with a baseline codec, such as an H264 codec. The initial encoding results in a set of baseline versions of the video data item, with different baseline versions corresponding to different resolutions. For example, application of the baseline codec results in a baseline version of the video data item at a 360p resolution, a baseline version of the video data item at a 480p resolution, a baseline version of the video data item at a 720p resolution, and a baseline version of the video data item at a 1080p resolution. However, in various embodiments, application of the baseline codec generates any number of versions of the video data item or versions of the video data item with any suitable resolutions.

To determine an order in which video data items are encoded by the online system 140, the online system 140 determines 310 a benefit to the online system 140 for encoding different video data items with each of a set of codecs. In various embodiments, the online system 140 determines 310 a benefit to the online system 140 for encoding each of at least a set of video data items with each codec of the set of codecs. The online system 140 determines 310 a benefit to the online system 140 for encoding a video data item with a codec based on a compression efficiency of the codec and a predicted watch time of the video data item by users of the online system 140.

In various embodiments, the online system 140 determines the compression efficiency of a codec based on historical compression efficiency of video data items previously encoded using the codec. The compression efficiency of a codec is specified relative to a baseline codec, such as the baseline codec used to initially encode the video data item. In various embodiments, the online system 140 determines the compression efficiency of a codec based on a time of the video data item available for display with a threshold video quality per specific amount of data when encoded with the codec. For example, the online system 140 determines a number of minutes of the video data item available for display at a threshold video quality per one gigabyte of data when the video data item is encoded with the codec. However, in other embodiments, the online system 140 determines any suitable temporal quantity of a video data item available for display at the threshold video quality per specific amount of data when encoded by the codec. The threshold video quality may be a specific resolution specified by the online system 140 or any other suitable characteristic describing display of video data to a user. For application of a codec to a video data item, the online system 140 determines an amount of time of the video data item available for display with a threshold video quality per specific amount of data for each of a set of versions of the video data encoded at different bitrates by the codec then determines a ratio of the specific amount of data to the average amount of time of the video data item available for display with the threshold video quality per specific amount of data for each of the set of versions of the video data encoded at different bitrates by the codec. Hence, the online system 140 accounts for compression efficiency of a coded based on an amount of time of a video data item encoded with the codec with at least the threshold video quality is available for display per specific amount of data, basing compression efficiency of capability of a user viewing video data with the threshold video quality. In various embodiments, the online system 140 maintains a table of relative compression efficiencies for different codecs based on historical encoding of video data items with different codecs (e.g., specific ratios of an amount of time that a user is capable of watching a video data item encoded with the codec with at least the threshold video quality per specific amount of data to an amount of time that a user is capable of watching a video data item encoded with a baseline codec with at least the threshold video quality per specific amount of data), allowing the online system 140 to retrieve a compression efficiency for a codec from the table.

Alternatively, the online system 140 trains a compression model to output a compression efficiency for a combination of a codec and a video data item based on characteristics of the video data item. Example characteristics of the video data item the compression model receives as input include a bit rate, dimensions of the video data (e.g., a height and a width of the video data item, which may be specified as numbers of pixels), and a duration of the video data item. In some embodiments, the online system 140 extracts information describing complexity of the video data item (e.g., objects in the video data item) using any suitable process and provides the information describing complexity of the video data item as input to the compression model. The online system 140 trains the compression model based on information describing encoding of video data items with a codec by the online system 140. For example, the online system 140 applies a label indicating a relative compression efficiency of the codec to the compression efficiency of the baseline codec to characteristics of a video data item previously encoded with the codec. From the labeled characteristics of the previously encoded video content items, the online system 140 trains the compression model using any suitable training method or combination of training methods and stores the trained compression model. The online system may maintain different compression models for different codecs in some embodiments.

Additionally, to determine 310 the benefit to the online system 140 for encoding a video data item with a codec, the online system 140 determines a predicted watch time of the video data item by users of the online system 140. To determine the predicted watch time of the video data item, the online system 140 applies a trained watch prediction model to characteristics of the video data item and to characteristics of a user from whom the video data item was obtained 305. Example characteristics of the video data item to which the trained watched prediction model is applied include: a duration of the video data item, dimensions of the video data item (e.g., a height and a width of the video data item, which may be specified as numbers of pixels), a type of the video data item, one or more privacy settings of the video data item, a length of time the video data item has been accessible to users via the online system 140, and any other suitable information describing the video data item. A privacy setting of the video data item is specified by the user from whom the video data item was obtained 305 and specifies whether the video data item is accessible to users of the online system 140 as a whole or is accessible to users having one or more specific criteria specified by the user from whom the video data item was obtained 305 (e.g., other users having a connection to the user via the online system 140). The type of video data item indicates whether the video data item is accessible for a limited amount of time, whether the video data item is live video data, or identifies a category associated with the video data item by the online system 140. In some embodiments, the watch prediction model also receives prior interaction with the video data item by users as an input. Example prior interactions with the video data item include interactions with the video data item occurring during different time intervals (e.g., within an hour before the watch prediction model is applied, within 30 minutes before the watch prediction model is applied, within one minute before the watch prediction model is applied). Prior interactions with the video data item include an aggregate amount of time the video data item was displayed to users of the online system, so the watch prediction model may receive as input different aggregated amounts of time the video data item was displayed to users of the online system during different time intervals. Example characteristics of a user from whom the video data item was obtained 305 include a geographic location of the user (e.g., a country associated with the user), a number of users of the online system 140 connected to the user, as well as any other suitable information.

To train the watch prediction model, the online system 140 leverages information describing prior video data items displayed to user to generate a training set of labeled data. The training data includes examples that each identify characteristics of a previously displayed video data item, characteristics of a user from whom the previously displayed video data item was obtained, and interactions by users with the previously displayed video data item, with a label identifying an aggregate amount of time users watched the previously displayed video data item applied to the characteristics of a previously displayed video data item, characteristics of a user from whom the previously displayed video data item was obtained, and interactions by users with the previously displayed video data item. This allows the watch prediction model to be trained to output a predicted aggregate amount of time users of the online system 140 will watch the video data item during the specific time interval (e.g., during a sixty minute interval after application of the watch prediction model). From the labeled characteristics of the previously encoded video content items, the online system 140 trains the compression model using any suitable training method or combination of training methods. For example, the online system 140 applies the watch prediction model to examples from the training data of previously displayed video data items and determine an error term from a difference between the label applied to the example of the training data and the predicted aggregate amount of time users of the online system 140 will watch the previously presented video data item during the specific time interval corresponding to the example. The error term may be generated through any suitable loss function, or combination of loss functions, in various embodiments. For example, the online system 140 determines error terms corresponding to a root mean square error and a mean absolute percentage error, allowing the online system 140 to account for outliers when training the model through the root mean square error and maintain sensitivity to small values through the mean absolute percentage error. In some embodiments, the online system 140 selects a loss function based on one or more characteristics of a previously displayed video data item or of interactions with the previously displayed video data item. For example, the online system 140 determines a loss term using mean absolute percentage error for a previously displayed video data item having at least a threshold amount of interaction (e.g., at least a threshold amount of aggregated amount of time the video data item was displayed to users of the online system during a time interval), and determines the loss term using root mean square error for a previously displayed video data item having less than the threshold amount of interaction (e.g., less than the threshold amount of aggregated amount of time the video data item was displayed to users of the online system during a time interval).

The online system 140 backpropagates the one or more error terms from the label applied to the previously displayed video data item corresponding to an example of the training data and the predicted aggregate amount of time users of the online system 140 will watch the previously presented video data item through the layers of the watch prediction model. One or more parameters of the watch prediction model are modified through any suitable technique from the backpropagation of the one or more error terms through the watch prediction model. The backpropagation of the one or more error terms is repeated by the online system 140 until the one or more loss functions satisfy one or more criteria. In some embodiments, the online system 140 uses gradient descent or any other suitable process to minimize the one or more error terms in various embodiments. In response to the one or more loss functions satisfying the one or more criteria and the online system 140 stopping the backpropagation of the one or more error terms, the online concierge system 140 stores a set of parameters describing the watch prediction model.

To account for video data items having less than a threshold amount of prior interactions by users of the online system 140 when determining predicted watch time, the online system 140 trains and maintains an initial watch prediction model that accounts for limited amount of interaction by users with video data items. In various embodiments, when the amount of interaction with a video data item is less than a threshold amount, the online system 140 uses the initial watch prediction model to characteristics of the video data and to characteristics of the user from whom the video data item was obtained 305. For example, the online system 140 determines that an aggregate amount of time users of the online system 140 have watched a video data item during a specific time interval is less than a threshold duration and applies the initial watch prediction model to the video data item to determine the watch prediction of the video data item. The initial watch prediction model retrieves other video data items the online system 140 obtained 305 from the user from whom the video data item was obtained 305 and determines prior interaction with the other video data items obtained 305 from the users. For example, the online system 140 determines 305 aggregate amount of time different video data items obtained 305 from the user were displayed to online system users during different time intervals and generates an estimated aggregate amount of time video data items were displayed to online system users from the aggregate amount of time other video data items obtained 305 from the user were displayed to online system users (e.g., a mean, median, or mode aggregate amount of time different video data items obtained 305 from the user were displayed to online system users during a time interval). However, the online system 140 may determine any suitable estimated amount of user interaction with the video data item from user interactions with other video data items obtained 305 from the user. In some embodiments, the online system 140 identifies other video data items obtained 305 from the user having one or more characteristics matching characteristics of the video data item to determine estimated amount of interaction with the video data item. The online system 140 trains the initial predicted watch model similar to the predicted watch model further described above, using the estimated amount of interaction with the video data item in the initial predicted watch model rather than prior interactions with the video data item in the predicted watch model. The online system 140 applies the initial predicted watch model to characteristics of the video data item and characteristics of the user from whom the video content item was obtained 305 as well as to the estimated amount of interaction with the video data item determined from prior interactions by users with other video data items the online system 140 obtained 305 from the user. In various embodiments, when the amount of interaction (e.g., aggregate amount of time online system users watched the video data item) equals or exceeds the threshold amount, the online system 140 applies the watch prediction model to characteristics of the video data item, characteristics of the user, and prior interactions by online system users with the video data item.

Additionally, the online system 140 accounts for characteristics of client devices 110 of users accessing the online system 140 when determining a predicted watch time of a video data item. Based on characteristics of client devices 110 the online system 140 obtains from the client devices 110 or from the users associated with the client devices 110, the online system 140 determines a percentage of client devices 110 capable of displaying video data items encoded with different codecs. For example, certain client devices 110 are unable to display video data items encoded with certain codecs, which affects a predicted watch time of a video data item when encoded with the certain codecs. The online system 140 determines an effective predicted watch time of a video data item when encoded with a codec by applying the predicted watch model to the video data item, generating a predicted watch time of the video data item, and scaling the predicted watch time of the video data item by a percentage of client devices 110 capable of displaying video data items encoded with the codec. For example, the online system 140 determines from data describing client devices 110 configured to communicate with the online system 140 that 80% of client devices 110 are capable of displaying video data encoded with a particular codec, so when determining the predicted watch time of a video data item encoded with the particular codec, the online system 140 multiplies a predicted watch time of the video data item from the precited watch model by 80%. This determines an effective predicted watch time that accounts for a number of client devices 110 that are unable to display video data items encoded with certain codecs.

The online system 140 also determines 310 a computational cost for encoding a video data item with a codec. The online system 140 is unable to distribute a video data item encoded with a particular codec to users until the online system 140 stores a minimum set of versions of the video data item encoded with the particular codec, with the minimum set of versions including at least a specified group of different resolutions. For example, the minimum set of versions of the video data item includes versions of the video data item corresponding to resolutions of 360p, 480p, 760p, and 1080p. Different codecs may have different resolutions or numbers of versions of the video data item included in the minimum set of versions. From historical encoding of prior video data items with a codec, the online system 140 determines an amount of computing resources needed to generate different versions of the video data item in the minimum set of versions for the codec. The amount of computing resources may specify an amount of processor time to generate a version of the video data encoded with the codec, a number of processor cycles to generate the version of the video data encoded with the codec, or any other suitable value describing computing resources of the online system 140 used to generate a version of the video data encoded with the codec.

In various embodiments, the online system 140 determines 315 the computational cost of encoding a video data item with a codec by identifying versions of the video data item of the minimum set of versions for the codec that have not been generated by the online system 140. The online system 140 determines an amount of computing resources to generate each version of the video data item of the minimum set of versions of the codec that have not been generated and generates a value by combining each of the determined amount of computing resources. For example, the online system 140 generates the value as a sum of the amount of computing resources determined for each version of the minimum set of versions of the codec that has not been generated. The online system 140 assigns the generated value to each version of the minimum set of versions of the codec that has not been generated and combines the values assigned to each version of the minimum set of versions that has not been generated to determine 315 the computational cost of encoding the video data item with the codec. This allows the online system 140 to increase a priority of a particular codec as a number of versions of the video data item in the minimum set of versions of the codec increases, so the online system 140 prioritizes completion of generation of the number of versions of the video data item in the minimum set of versions, which allows the online system 140 to distribute the video data item encoded with the particular codec.

To order video content items for encoding, for each combination of video content and codec, the online system 140 determines 320 a ratio of the benefit to the online system 140 for encoding the video data item with a codec to the computational cost for encoding a video data item with a codec. Based on the ratios determined 320 for combinations of video data items and codecs, the online system 140 generates 325 a ranking of combinations of video data items and codecs. In various embodiments, the ranking includes combinations of video data items and codecs with higher ratios in higher positions of the ranking to prioritized encoding of video data items with codecs having higher ratios of benefit to cost. However, in various embodiments, the online system 140 generates 325 the ranking using any suitable criteria to optimize an order in which the online system 140 allocates computing resources to different combinations of video data items and codecs. Based on the generated ranking, the online system 140 encodes 330 video data items with corresponding codecs from combinations of video data items and codecs in an order specified by the ranking. This allows the online system 140 to allocate computing resources to prioritize encoding video data items with codecs that minimize subsequent buffering times for obtaining and displaying video data items and allow users with limited bandwidth for connecting to the online system 140 to access and view an increased amount of video data items with improved video quality.

Figure 4:
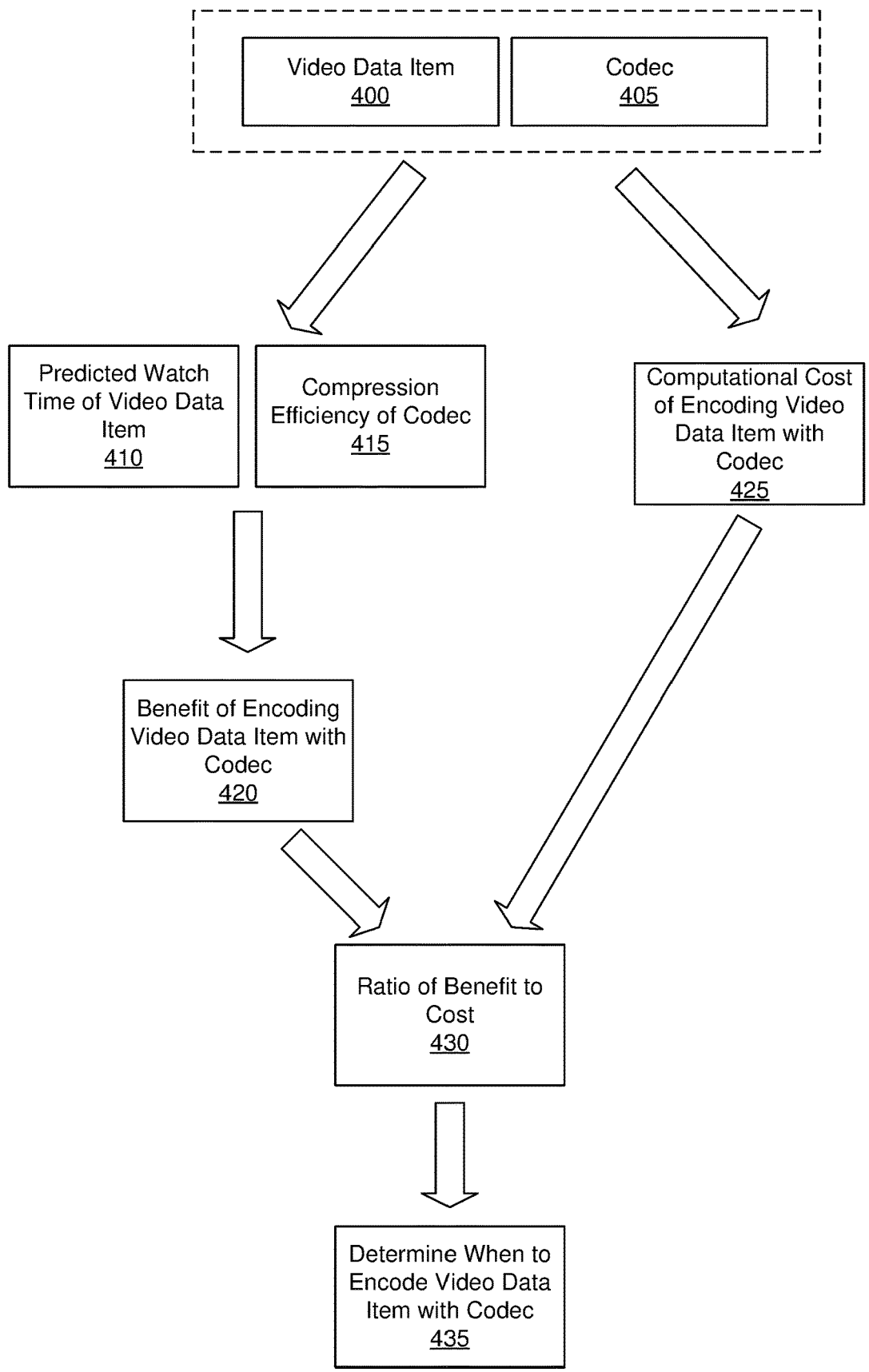
FIG. 4 is a process flow diagram of an online system determining when to encode a video data item with a codec accounting for a benefit to the online system of encoding the video data item with the codec and the computational cost to the online system of encoding the video data item with the codec, in accordance with an embodiment.

FIG. 4 is a process flow diagram of an online system 140 determining when to encode a video data item 400 with a codec 405 maintained by the online system 140 accounting for the benefit to the online system 140 of encoding the video data item 400 with the codec 405 and the computational cost to the online system 140 of encoding the video data item 400 with the codec 405. For purposes of illustration, FIG. 4 shows a single combination of video data item 400 and codec 405 being evaluated by the online system 140. As further described above in combination with FIG. 3, the online system 140 determines a predicted watch time 400 of the video data item 400 by users of the online system 140. The predicted watch time 410 is an aggregate amount of time the video content item is likely to be displayed to users of the online system 140, accounting for display of the video data item to multiple users of the online system 140. In various embodiments, the online system 140 applies a trained watch prediction model to characteristics of the video data item 400, characteristics of a user from whom the video data item 400 was obtained, and prior interactions by online system users with the video data item to determine the predicted watch time 410 of the video data item 400.

The online system 140 also determines a compression efficiency 415 of the codec 405 for application to the video data item 400. When determining the compression efficiency 415, the online system 140 evaluates determines an amount of time of the video data item 400 available for display with a threshold video quality per specific amount of data when encoded with the codec 405, as further described above in conjunction with FIG. 3. The compression efficiency 415 is determined relative to a baseline codec that is applied by the online system 140 in various embodiments. Thus, the compression efficiency 415 is based on a length of time that the video data item 400 is capable of being displayed via a client device 110 that receives the specific amount of data, allowing the compression efficiency 415 to account for how much of the video data item 400 is available for display to a user with a threshold video quality given the specific amount of data when encoded with the codec 405, accounting for user consumption of the video data item 400 by users.

From the compression efficiency 415 of the codec 405 and the predicted watch time 410 of the video data item 400, the online system 140 determines a benefit 420 to the online system 140 of encoding the video data item 400 with the codec 405. In various embodiments, the benefit 420 is a product of the compression efficiency 415 of the codec and the predicted watch time 410 of the video data item 400, while in other embodiments the benefit 420 is determined in any suitable manner from the predicted watch time 410 of the video data item 400 an the compression efficiency 415 of the codec. Hence, the benefit 420 of encoding the video data item 400 with the codec 405 accounts for a predicted amount of interaction, such as viewing, by users of the online system 140 with the video data item 400, allowing the online system 140 to consider likely popularity of the video data item 400 among online system users when determining the benefit 420 of encoding the video data item 400 with the codec 405.

Additionally, the online system 140 determines a computational cost 425 of encoding the video data 400 with the codec 405. As further described above in conjunction with FIG. 3, the online system 140 determines the computational cost 425 from prior encoding of other video data items with the codec 405, as well as a number of versions of the video data item 400 yet to be generated from application of the codec 405 to the video data item 400. The online system 140 determines a ratio 430 of the benefit 420 of encoding the video data item with the coded 405 to the computational cost 425 of encoding the video data with the codec 405 and determines 435 when to encode the video data item 400 with the codec 405 based on the determined ratio 430, as further described above in conjunction with FIG. 3. This allows the online system 140 to prioritize allocation of computing resources to combinations of video data items 400 and codecs 405 providing greater benefit 420 to the online system 140, when accounting for predicted display of the video data items 400 to users, relative to computational costs 425 of encoding video data items 400 with particular codec 405. This allows the online system 140 to more efficiently allocate computing resources for combinations of codecs 405 and video data items 400 having greater predicted popularity for display to online system users.

Additional Considerations

The foregoing description of the embodiments has been presented for the purpose of illustration; it is not intended to be exhaustive or to limit the patent rights to the precise forms disclosed. Persons skilled in the relevant art can appreciate that many modifications and variations are possible in light of the above disclosure.

Some portions of this description describe the embodiments in terms of algorithms and symbolic representations of operations on information. These algorithmic descriptions and representations are commonly used by those skilled in the data processing arts to convey the substance of their work effectively to others skilled in the art. These operations, while described functionally, computationally, or logically, are understood to be implemented by computer programs or equivalent electrical circuits, microcode, or the like. Furthermore, it has also proven convenient at times, to refer to these arrangements of operations as modules, without loss of generality. The described operations and their associated modules may be embodied in software, firmware, hardware, or any combinations thereof.

Any of the steps, operations, or processes described herein may be performed or implemented with one or more hardware or software modules, alone or in combination with other devices. In one embodiment, a software module is implemented with a computer program product comprising a computer-readable medium containing computer program code, which can be executed by a computer processor for performing any or all of the steps, operations, or processes described.

Embodiments may also relate to an apparatus for performing the operations herein. This apparatus may be specially constructed for the required purposes, and/or it may comprise a general-purpose computing device selectively activated or reconfigured by a computer program stored in the computer. Such a computer program may be stored in a non-transitory, tangible computer readable storage medium, or any type of media suitable for storing electronic instructions, which may be coupled to a computer system bus. Furthermore, any computing systems referred to in the specification may include a single processor or may be architectures employing multiple processor designs for increased computing capability.

Embodiments may also relate to a product that is produced by a computing process described herein. Such a product may comprise information resulting from a computing process, where the information is stored on a non-transitory, tangible computer readable storage medium and may include any embodiment of a computer program product or other data combination described herein.

Finally, the language used in the specification has been principally selected for readability and instructional purposes, and it may not have been selected to delineate or circumscribe the patent rights. It is therefore intended that the scope of the patent rights be limited not by this detailed description, but rather by any claims that issue on an application based hereon. Accordingly, the disclosure of the embodiments is intended to be illustrative, but not limiting, of the scope of the patent rights, which is set forth in the following claims.

What is claimed is:

1. A method comprising:
    maintaining, at an online system, a set of codecs for encoding video data;
    obtaining, at the online system, video data items from users of the online system;
    for each combination of video data item obtained by the online system and codec of the set:
        determining a benefit to the online system of encoding a video data item with a codec of the set, the benefit to the online system based on (1) a compression efficiency of the codec and (2) a predicted aggregate amount of time users of the online system will watch the video data item during a specific time interval;

determining a computational cost to the online system of encoding the video data item with the codec of the set; and determining a ratio of the benefit to the online system of encoding the video data item with the codec of the set to the computational cost to the online system of encoding the video data item with the codec of the set;

generating a ranking of combinations of video data items and codecs of the set based on the determined ratios; and encoding, by the online system, video data items with corresponding codecs from combinations of video data items and codecs in an order specified by the ranking.

2. The method of claim 1, wherein determining the benefit to the online system of encoding the video data item with the codec of the set comprises:

determining a number of minutes of the video data item available to watch at a threshold video quality per specific amount of data when encoded with the codec based on video data items previously encoded with the codec;

determining a number of minutes of the video data item available to watch at the threshold video quality per specific amount of data when encoded with a baseline codec; and determining the compression efficiency of the codec as a ratio of the number of minutes of the video data item available to watch at the threshold video quality per specific amount of data when encoded with the codec to the number of minutes of the video data item available to watch at the threshold video quality per specific amount of data when encoded with the baseline codec.

3. The method of claim 2, wherein the specific amount of data comprises one gigabyte of data.

4. The method of claim 2, wherein determining the number of minutes of the video data item available to watch at the threshold video quality per specific amount of data when encoded with the codec based on video data items previously encoded with the codec comprises:

for each of a set of versions of the video data encoded by the codec, determining a number of minutes of a version of the video data item available to watch at the threshold video quality per specific amount of data when encoded with the codec; and determining the number of minutes of the video data item available to watch at the threshold video quality per specific amount of data based on an average of the number of minutes of the version of the video data item available to watch at the threshold video quality per specific amount of data when encoded with the codec for each version of the set of versions.

5. The method of claim 1, wherein determining the benefit to the online system of encoding the video data item with the codec of the set comprises:

applying a trained watch prediction model to characteristics of the video data item, to characteristics of a user from whom the video data item was obtained, and to prior interactions with the video data item by users of the online system, the trained watch prediction model outputting the predicted aggregate amount of time users of the online system will watch the video data item during the specific time interval.

6. The method of claim 5, wherein characteristics of the video data item are selected from a group consisting of: a duration of the video data item, dimensions of the video data item, a type of the video data item, one or more privacy settings of the video data item, a length of time the video data item has been accessible to users via the online system, and any combination thereof.

7. The method of claim 5, wherein characteristics of the user from whom the video data item was obtained are selected from a group consisting of: a geographic location of the user, a number of users of the online system connected to the user, and any combination thereof.

8. The method of claim 5, wherein prior interactions with the video data item by users of the online system comprise prior aggregate amounts of time the video data item was displayed to users of the online system during one or more intervals prior to application of the trained watch prediction model.

9. The method of claim 5, wherein determining the benefit to the online system of encoding the video data item with the codec of the set comprises further comprises:

determining a percentage of client devices configured to communicate with the online system capable of displaying video data encoded with the codec of the set from characteristics of client devices configured to communicate with the online system; and determining an effective predicted watch time of the video data item as a product of the predicted aggregate amount of time users of the online system will watch the video data item during the specific time interval and the percentage of client devices communicating with the online system capable of displaying video data encoded with the codec of the set.

10. The method of claim 5, wherein applying the trained watch prediction model to characteristics of the video data item, to characteristics of a user from whom the video data item was obtained, and to prior interactions with the video data item by users of the online system comprises:

determining an amount of interaction with the video data item from the prior interactions with the video data item;

responsive to the amount of interaction with the video data item being less than a threshold amount:

retrieving other video data items the online system obtained from the user;

determining prior interactions by users of the online system with the other video data items the online system obtained from the user; and applying an initial watch prediction model to characteristics of the video data item, to characteristics of a user from whom the video data item was obtained, and to the prior interactions by users of the online system with the other video data items the online system obtained from the user, the initial watch prediction model outputting the predicted aggregate amount of time users of the online system will watch the video data item during the specific time interval.

11. The method of claim 10, wherein applying the trained watch prediction model to characteristics of the video data item, to characteristics of a user from whom the video data item was obtained, and prior interactions with the video data item by users of the online system further comprises:

responsive to the amount of interaction with the video data item equaling or exceeding the threshold amount, applying the trained watch prediction model to characteristics of the video data item, to characteristics of the user from whom the video data item was obtained, and to prior interactions with the video data item by users of the online system.

12. A computer program product comprising a non-transitory computer-readable storage medium having instructions encoded thereon that, when executed by a processor, cause the processor to:
- maintain, at an online system, a set of codecs for encoding video data;
- obtain, at the online system, video data items from users of the online system;
- for each combination of video data item obtained by the online system and codec of the set:
  - determine a benefit to the online system of encoding a video data item with a codec of the set, the benefit to the online system based on (1) a compression efficiency of the codec and (2) a predicted aggregate amount of time users of the online system will watch the video data item during a specific time interval;
  - determine a computational cost to the online system of encoding the video data item with the codec of the set; and
  - determine a ratio of the benefit to the online system of encoding the video data item with the codec of the set to the computational cost to the online system of encoding the video data item with the codec of the set;
- generate a ranking of combinations of video data items and codecs of the set based on the determined ratios; and
- encode, by the online system, video data items with corresponding codecs from combinations of video data items and codecs in an order specified by the ranking.

13. The computer program product of claim 12, wherein determine the benefit to the online system of encoding the video data item with the codec of the set comprises:
- determine a number of minutes of the video data item available to watch at a threshold video quality per specific amount of data when encoded with the codec based on video data items previously encoded with the codec;
- determine a number of minutes of the video data item available to watch at the threshold video quality per specific amount of data when encoded with a baseline codec; and
- determine the compression efficiency of the codec as a ratio of the number of minutes of the video data item available to watch at the threshold video quality per specific amount of data when encoded with the codec to the number of minutes of the video data item available to watch at the threshold video quality per specific amount of data when encoded with the baseline codec.

14. The computer program product of claim 13, wherein the specific amount of data comprises one gigabyte of data.

15. The computer program product of claim 13, wherein determine the number of minutes of the video data item available to watch at the threshold video quality per specific amount of data when encoded with the codec based on video data items previously encoded with the codec comprises:
- for each of a set of versions of the video data encoded by the codec, determine a number of minutes of a version of the video data item available to watch at the threshold video quality per specific amount of data when encoded with the codec; and
- determine the number of minutes of the video data item available to watch at the threshold video quality per specific amount of data based on an average of the number of minutes of the version of the video data item available to watch at the threshold video quality per specific amount of data when encoded with the codec for each version of the set of versions.

16. The computer program product of claim 12, wherein determine the benefit to the online system of encoding the video data item with the codec of the set comprises:
- apply a trained watch prediction model to characteristics of the video data item, to characteristics of a user from whom the video data item was obtained, and to prior interactions with the video data item by users of the online system, the trained watch prediction model outputting the predicted aggregate amount of time users of the online system will watch the video data item during the specific time interval.

17. The computer program product of claim 16, wherein characteristics of the video data item are selected from a group consisting of: a duration of the video data item, dimensions of the video data item, a type of the video data item, one or more privacy settings of the video data item, a length of time the video data item has been accessible to users via the online system, and any combination thereof.

18. The computer program product of claim 16, wherein characteristics of the user from whom the video data item was obtained are selected from a group consisting of: a geographic location of the user, a number of users of the online system connected to the user, and any combination thereof.

19. The computer program product of claim 16, wherein prior interactions with the video data item by users of the online system comprise prior aggregate amounts of time the video data item was displayed to users of the online system during one or more intervals prior to application of the trained watch prediction model.

20. The computer program product of claim 16, wherein determine the benefit to the online system of encoding the video data item with the codec of the set comprises further comprises:
- determine a percentage of client devices configured to communicate with the online system capable of displaying video data encoded with the codec of the set from characteristics of client devices configured to communicate with the online system; and
- determine an effective predicted watch time of the video data item as a product of the predicted aggregate amount of time users of the online system will watch the video data item during the specific time interval and the percentage of client devices communicating with the online system capable of displaying video data encoded with the codec of the set.

21. The computer program product of claim 16, wherein apply the trained watch prediction model to characteristics of the video data item, to characteristics of a user from whom the video data item was obtained, and to prior interactions with the video data item by users of the online system comprises:
- determine an amount of interaction with the video data item from the prior interactions with the video data item;
- responsive to the amount of interaction with the video data item being less than a threshold amount:
  - retrieve other video data items the online system obtained from the user;
  - determine prior interactions by users of the online system with the other video data items the online system obtained from the user; and
  - apply an initial watch prediction model to characteristics of the video data item, to characteristics of a user from whom the video data item was obtained, and to the prior interactions by users of the online system with the other video data items the online system obtained from the user, the initial watch prediction model outputting the predicted aggregate amount of time users of the online system will watch the video data item during the specific time interval.

22. The computer program product of claim 21, wherein apply the trained watch prediction model to characteristics of the video data item, to characteristics of a user from whom the video data item was obtained, and prior interactions with the video data item by users of the online system further comprises:

responsive to the amount of interaction with the video data item equaling or exceeding the threshold amount, apply the trained watch prediction model to characteristics of the video data item, to characteristics of the user from whom the video data item was obtained, and to prior interactions with the video data item by users of the online system.

* * * * *